United States Patent
Sadowski et al.

(10) Patent No.: US 11,867,290 B2
(45) Date of Patent: Jan. 9, 2024

(54) COMBUSTION SEAL INCLUDING CYLINDER LINER AND SHIM

(71) Applicant: DRIV Automotive Inc., Lake Forest, IL (US)

(72) Inventors: Michael Sadowski, Elmhurst, IL (US); Steven W. Kueltzo, Aurora, IL (US)

(73) Assignee: Federal-Mogul Motorparts LLC, Northville, MI (US)

( * ) Notice: Subject to any disclaimer, the term of this patent is extended or adjusted under 35 U.S.C. 154(b) by 207 days.

(21) Appl. No.: 17/213,842

(22) Filed: Mar. 26, 2021

(65) Prior Publication Data
US 2021/0301923 A1 Sep. 30, 2021

Related U.S. Application Data

(60) Provisional application No. 63/000,635, filed on Mar. 27, 2020.

(51) Int. Cl.
*F16J 15/06* (2006.01)
*F02F 1/00* (2006.01)

(52) U.S. Cl.
CPC ............... *F16J 15/06* (2013.01); *F02F 1/004* (2013.01)

(58) Field of Classification Search
CPC .. F16J 15/06; F16J 15/0831; F16J 2015/0862; F16J 15/062; F02F 1/004; F02F 11/002; F02F 11/005
See application file for complete search history.

(56) References Cited

U.S. PATENT DOCUMENTS 2,744,514 A * 5/1956 Vidmar ............... F02F 11/002
123/193.3
3,586,338 A * 6/1971 Miklau ............... F16J 15/123
277/596
(Continued)

FOREIGN PATENT DOCUMENTS

| CN | 101268270 A | 9/2008 |
| JP | 3420649 B2 | 6/2003 |
| JP | 4258980 B2 | 4/2009 |

OTHER PUBLICATIONS

Apex Tool Company, Inc.; "Use of Sleeves, Shims and Bushings in Counterbores"; Jan. 21, 2020; https://www.apexinds.com/blog/use-sleeves-shims-bushings counterbores/ (2 pages).

(Continued)

*Primary Examiner* — Kurt Philip Liethen
(74) *Attorney, Agent, or Firm* — DRIV Automotive Inc.

(57) ABSTRACT

An engine includes an engine block and a cylinder head mounted to the engine block. The engine block includes a bore elongated along an axis and a liner disposed in the bore and extending annularly about the axis. The liner includes a seal surface and a fire dam disposed radially inward from the seal surface. The fire dam extends along the axis from the seal surface towards the cylinder head. The engine further includes a head gasket disposed between the engine block and the cylinder head. The head gasket extends endlessly around the fire dam. The engine further includes a shim seated between the seal surface and the head gasket and abutting the seal surface and the head gasket. The shim is disposed radially outward from the fire dam and extending annularly about the axis.

20 Claims, 6 Drawing Sheets

(56) References Cited

U.S. PATENT DOCUMENTS

| | | | | |
|---|---|---|---|---|
| 4,372,156 | A * | 2/1983 | Meismer | G01B 5/14 |
| | | | | 73/114.77 |
| 5,927,724 | A * | 7/1999 | Maschmann | F16J 15/0825 |
| | | | | 277/593 |
| 6,827,352 | B2 | 12/2004 | Ueta et al. | |
| 6,931,705 | B2 | 8/2005 | Kueltzo et al. | |
| 7,025,358 | B2 | 4/2006 | Ueta et al. | |
| 8,336,888 | B2 | 12/2012 | Fatora et al. | |
| 2003/0221654 | A1 | 12/2003 | Kueltzo et al. | |
| 2007/0024009 | A1 * | 2/2007 | Rosenquist | F16J 15/0825 |
| | | | | 277/592 |
| 2007/0090607 | A1 * | 4/2007 | Ueta | F16J 15/0825 |
| | | | | 277/593 |
| 2018/0003300 | A1 | 1/2018 | Watanabe et al. | |

OTHER PUBLICATIONS

First Office Action from CNIPA regarding Chinese Patent Application No. 202110320624 dated Jan. 6, 2023 (7 pages) (without English translation).

* cited by examiner

COMBUSTION SEAL INCLUDING CYLINDER LINER AND SHIM

This application claims priority to and all benefits of U.S. Provisional Patent Application 63/000,635 filed Mar. 27, 2020, which is incorporated herein by reference.

BACKGROUND

Internal combustion engines include a cylinder head that is removable from an engine block to allow access to internal components for assembly and repair. A head gasket is disposed between the cylinder head and the engine block and prevents leakage of gas and/or fluid between the cylinder head and the engine block. The cylinder head may be fastened to the engine block with fasteners, e.g., bolts, that extend through the cylinder head and threadedly engage holes in the engine block to retain the gasket between the cylinder head and the engine block.

The engine block includes cylinders that receive pistons of the engine. In some types of engines, e.g., a diesel engine, the engine block includes liners disposed in respective bores of the engine block, e.g., via an interference fit between the liner, the bore, and an o-ring on one of the liner or the bore. The liners define cylinders in the engine block. In such an example, the head gasket may be compressed by the cylinder head against the liner to seal around the liner. Proper sealing between the cylinder head and the liner and also the between the cylinder head and engine block to prevent leakage therebetween is dependent upon proper alignment of the liner relative to the engine block. The integrity of the seal at either the liner or the engine block may be compromised in scenarios when the liner is improperly aligned relative to the engine block, e.g., due to manufacturing tolerances, wear, etc., which can result in the liner being misaligned with the engine block.

During maintenance of the diesel engine, the liner may be removed from the engine block and replaced to perfect the seal around the liner. For example, upon removing the liner, the bores of the engine block may be bored to increase a depth to a ledge supporting the liner and at least one shim may be positioned on the ledge. A new liner may then be inserted into the bore on top of the shim to perfect the seal around the liner.

DETAILED DESCRIPTION

Figure 1:
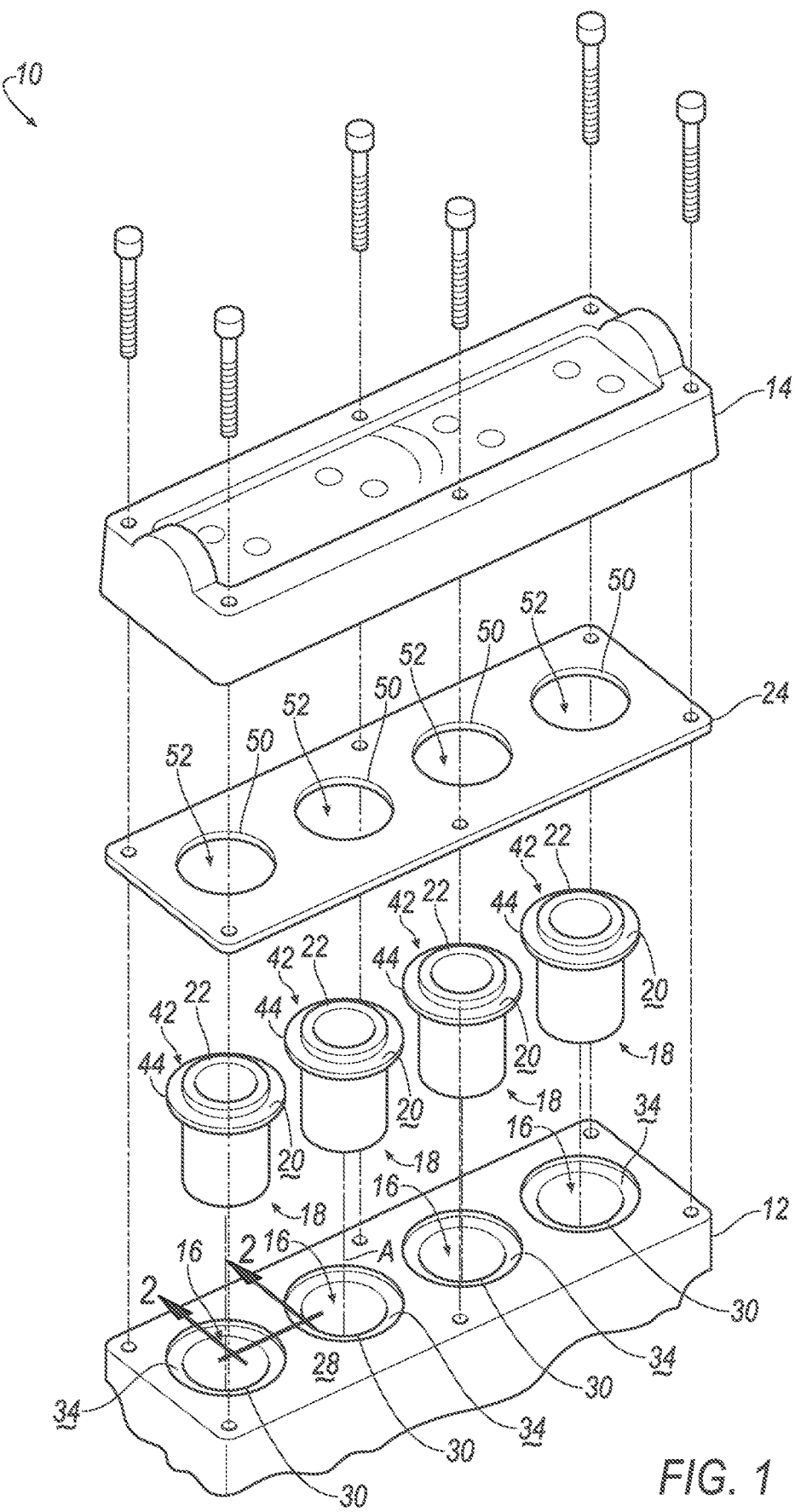
FIG. 1 is an exploded view of an engine including a cylinder head, an engine block, a plurality of liners, and a head gasket.

An engine includes an engine block and a cylinder head mounted to the engine block. The engine block includes a bore elongated along an axis and a liner disposed in the bore and extending annularly about the axis. The liner includes a seal surface and a fire dam disposed radially inward from the seal surface. The fire dam extends along the axis from the seal surface towards the cylinder head. The engine further includes a head gasket disposed between the engine block and the cylinder head. The head gasket extends endlessly around the fire dam. The engine further includes a shim seated between the seal surface and the head gasket and abutting the seal surface and the head gasket. The shim is disposed radially outward from the fire dam and extending annularly about the axis.

The shim may be endless around the fire dam.

The engine block may include a deck surface. The seal surface may be disposed between the deck surface and the cylinder head.

The shim may include an inner diameter and a plurality of tabs extending radially inward from the inner diameter toward the fire dam. The plurality of tabs may be circumferentially spaced from each other.

The shim may include an inner diameter and the head gasket includes a wall extending circumferentially about the fire dam. The wall may define an opening having a diameter equal to or less than the inner diameter.

The shim may include a plurality of tabs extending radially inward from the inner diameter toward the fire dam. The plurality of tabs may be circumferentially spaced from each other.

The shim may have a thickness along the axis. The thickness may be between 0.001-0.009 inches.

The shim may be further defined as a plurality of shims stacked along the axis.

At least one of the plurality of shims may have a different thickness along the axis than the other of the plurality of shims.

The shim may have a rectangular cross-section along the axis.

The shim may be metal.

A method includes removing a cylinder head and a head gasket to expose a seal surface of a liner disposed in a bore of an engine block. The method further includes measuring a height from the seal surface to a deck surface of the engine block. The method further includes selecting a shim based on determining a difference between the height and a specified height. The method further includes positioning the shim on the seal surface. The method further includes positioning the head gasket on the shim with the shim between the head gasket and the seal surface.

The method can further include forming the liner with a fire dam disposed radially inward from the seal surface and extending upwardly from the seal surface.

The method can further include forming the shim with an inner diameter and a plurality of tabs extending toward the fire dam and locating the shim relative to the fire dam.

The method can further include forming the shim with an inner diameter and forming the head gasket with a wall defining an opening having a diameter equal to or less than the inner diameter.

The method can further include forming the shim with a plurality of tabs extending from the inner diameter toward the fire dam and locating the shim relative to the fire dam.

The shim may further defined as a plurality of shims stacked along an axis. At least one of the plurality of shims may have a different thickness along the axis than the other of the plurality of shims.

The method can further include forming the shim with a rectangular cross-section along an axis.

The method can further include forming the shim with a thickness along an axis between 0.001-0.009 inches.

The method can further include forming the shim of metal.

With reference to the Figures, wherein like numerals indicate like parts throughout the several views, an engine 10 is generally shown. The engine 10 includes an engine block 12 and a cylinder head 14 mounted to the engine block 12. The engine block 12 includes a bore 16 elongated along an axis A and a liner 18 disposed in the bore 16 and extending annularly about the axis A. The liner 18 includes a seal surface 20 and a fire dam 22 disposed radially inward from the seal surface 20. The fire dam 22 extends along the axis A from the seal surface 20 towards the cylinder head 14. Th engine 10 further includes a head gasket 24 disposed between the engine block 12 and the cylinder head 14. The head gasket 24 extends endlessly around the fire dam 22. The engine 10 further includes a shim 26 seated between the seal surface 20 and the head gasket 24 and abutting the seal surface 20 and the head gasket 24. The shim 26 is disposed radially outward from the fire dam 22 and extends annularly about the axis A.

Figure 2A:
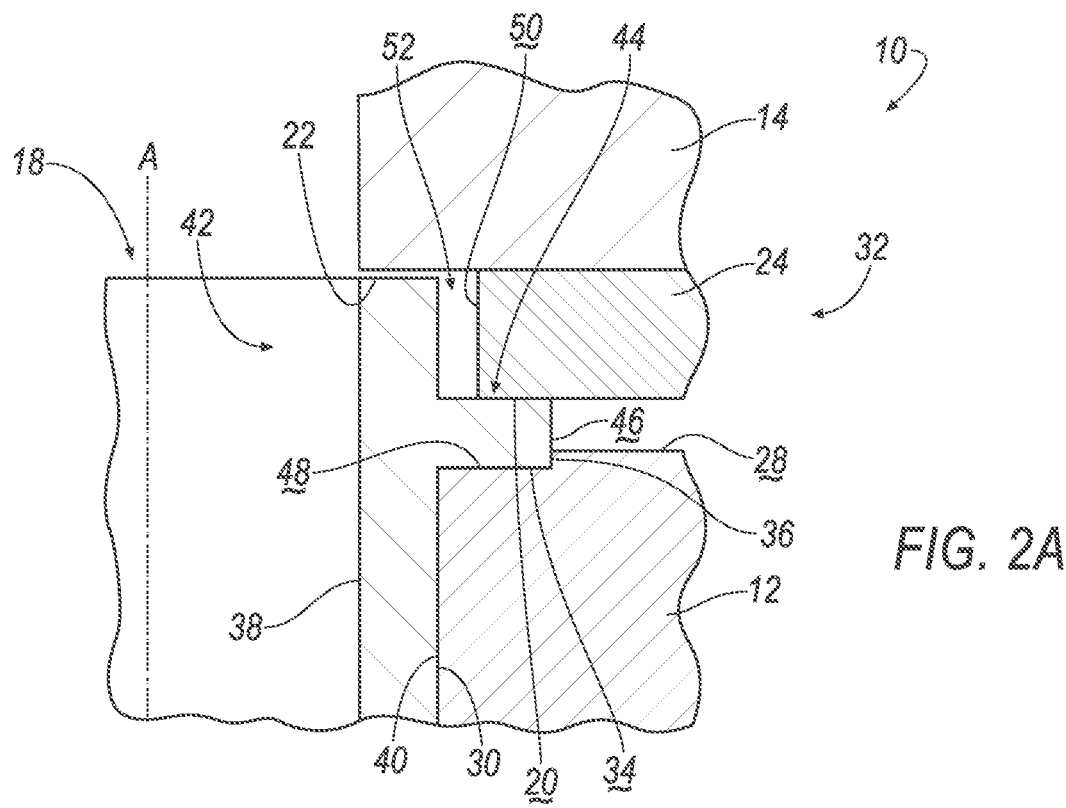
FIG. 2A is a cross-sectional view along line 2 of the engine including the head gasket creating a circumferentially continuous combustion seal around the liner.
Figure 2B:
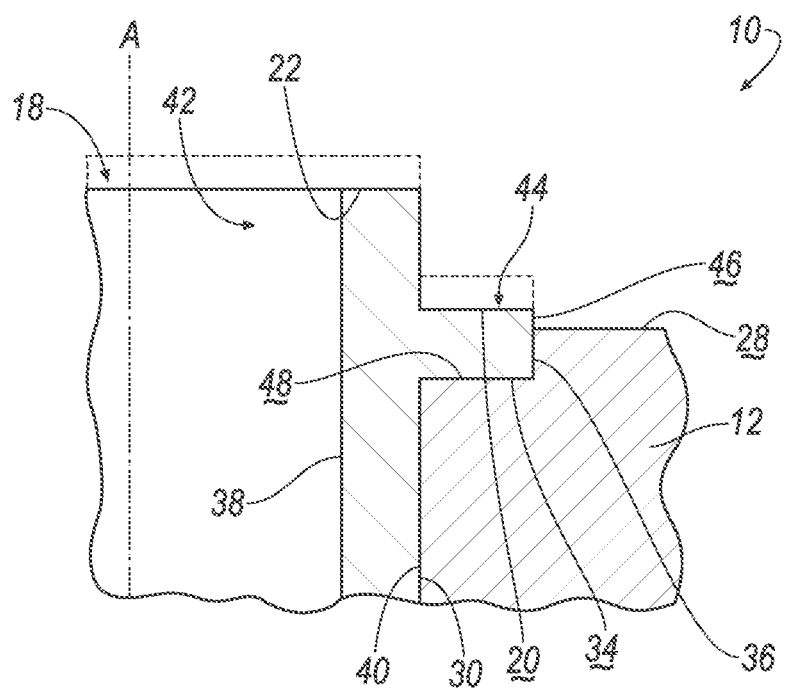
FIG. 2B is a cross-sectional view along line 2 of the engine including the liner misaligned relative to the engine block.
Figure 4A:
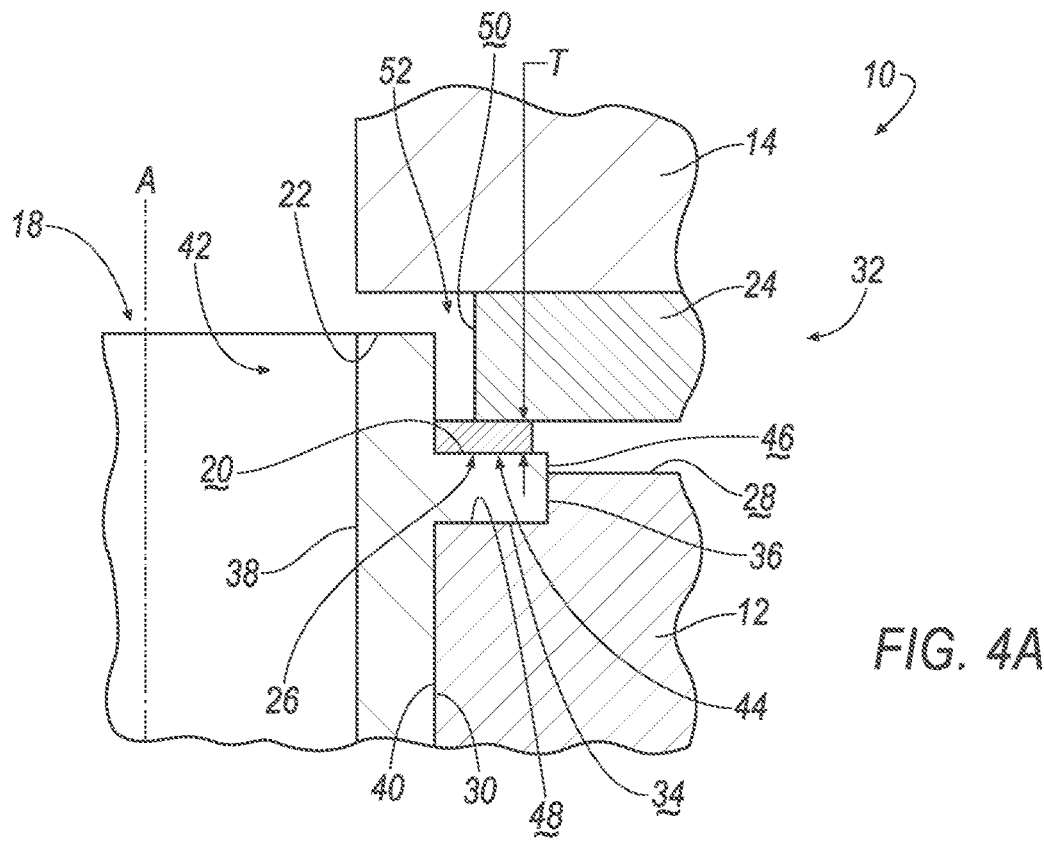
FIG. 4A is a cross-section view along line 2 of the engine including the shim abutting the liner and head gasket to perfect the circumferentially continuous combustion seal.
Figure 4B:
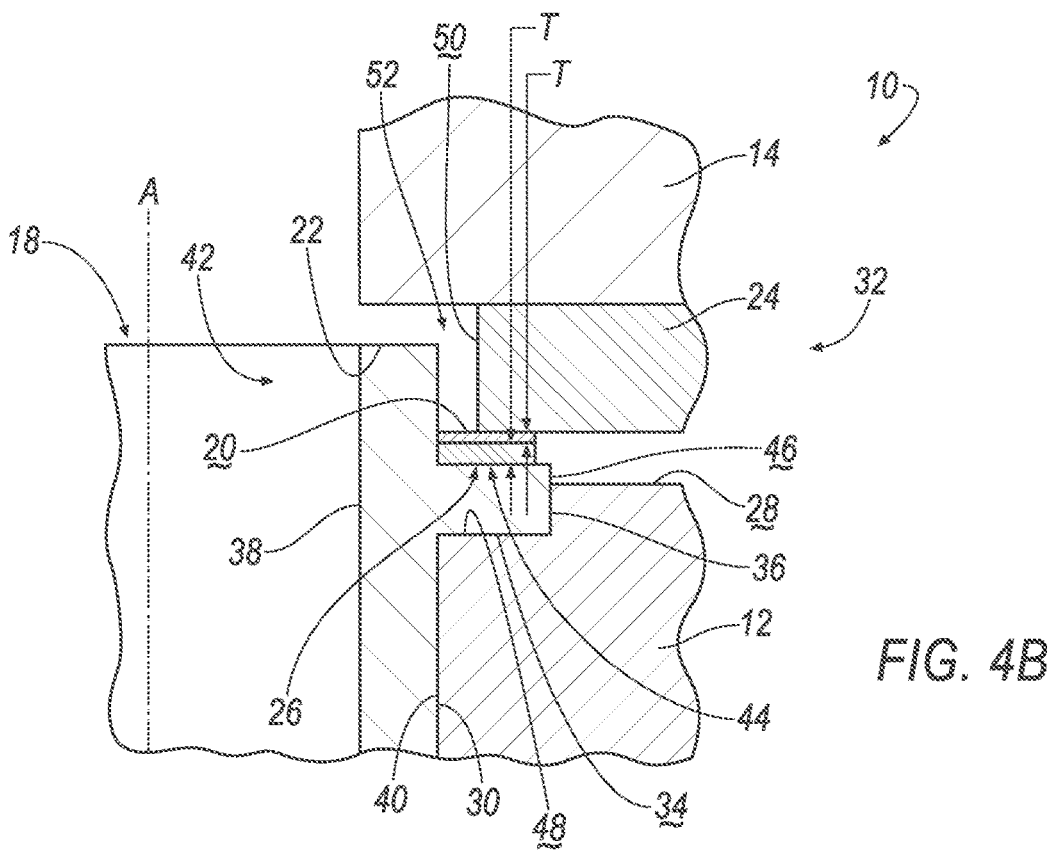
FIG. 4B cross-section view along line 2 of the engine including a plurality of shims stacked on each other and abutting the liner and head gasket to perfect the circumferentially continuous combustion seal.

When the cylinder head 14 is mounted to the engine block 12, the head gasket 24 is compressed between the cylinder head 14 and the seal surface 20 of the liner 18, as shown in FIG. 2A. That is, the head gasket 24 is seated on the seal surface 20 of the liner 18 and creates a circumferentially continuous combustion seal 32 around the liner 18, which prevents leakage of gas and/or fluid between the cylinder head 14 and the liner 18. However, during operation of the engine 10, the liner 18 may move axially relative to the engine block 12, e.g., due to manufacturing tolerances, wear, etc., such that the seal surface 20 of the liner 18 is axially misaligned relative to the engine block 12. In these circumstances, the misalignment of the liner 18 may cause an insufficient compressive load to be distributed to the liner 18, which can create the potential for leakage of fluid between the cylinder head 14 and the liner 18. FIG. 2B shows the cylinder head 14 and the head gasket 24 in broken lines to illustrate the misalignment of the liner 18 relative to the engine block 12. Advantageously, as shown in FIGS. 4A-4B, without removing the liner 18 from the engine block 12, the shim 26 is positioned on the seal surface 20 of the liner 18 to perfect the circumferentially continuous combustion seal 32.

With reference to FIG. 1, the engine 10 includes the engine block 12 and the cylinder head 14. The engine block 12 includes a deck surface 28 facing the cylinder head 14. For example, the deck surface 28 may be a top surface of the engine block 12. The deck surface 28 includes fastener holes (not numbered) that receive fasteners (not numbered). The fastener holes of the deck surface 28 are threaded. The fastener holes extend along the axis A. The engine block 12 and the cylinder head 14 are metal, e.g., cast iron, steel, etc. The engine block 12 and the cylinder head 14 may be a same or different metal.

With continued reference to FIG. 1, the cylinder head 14 is removably mounted to the engine block 12, e.g., the deck surface 28. The cylinder head 14 includes fastener holes that receive fasteners. The fastener holes extend through the cylinder head 14, i.e., have two open ends. The fastener holes of the cylinder head 14 align with the fastener holes of the deck surface 28 when the cylinder head 14 is assembled to the engine block 12. The fasteners extend through the fastener holes of the cylinder head 14, i.e. through both open ends, and threadedly engage the fastener holes of the deck surface 28. The fastener holes of the cylinder head 14 may be smooth, i.e., not threaded. The fasteners may be of any suitable type, dimension, etc. The engine 10 may include any suitable number of fasteners. The engine 10 may be any suitable type of internal combustion engine including a diesel engine, gasoline engine, etc.

With continued reference to FIG. 1, the engine block 12 includes a plurality of bores 16 extending from the deck surface 28 along the axis A away from the cylinder head 14, e.g., towards a crankshaft (not shown) spaced from the cylinder head 14. Each bore 16 includes a bore wall 30 extending annularly about the axis A.

Each bore 16 includes a ledge 34 spaced from the deck surface 28 along the axis A, as shown in FIGS. 2A, 2B and 4. In other words, the deck surface 28 is disposed between the ledge 34 and the cylinder head 14 when the cylinder head 14 is mounted to the engine block 12. The ledge 34 extends circumferentially, i.e., endlessly, about the axis A. The ledge 34 supports the liner 18 in the bore 16, as discussed further below.

Additionally, each bore 16 includes a step wall 36 extending along the axis A from the deck surface 28 to the ledge 34, as shown in FIGS. 2A, 2B and 4. The step wall 36 may extend any suitable amount along the axis A. That is, the ledge 34 may be spaced any suitable amount along the axis A from the deck surface 28. The step wall 36 extends annularly about the axis A. The step wall 36 is disposed radially outboard from the bore wall 30. The step wall 36 includes a diameter that is larger than a diameter of the bore wall 30. The ledge 34 extends radially inward from the step wall 36 to the bore wall 30.

With reference to FIGS. 2A, 2B and 4, the liner 18 and the bore 16 are coaxial, i.e., are elongated along the axis A, when the liner 18 is assembled to the engine block 12, i.e., disposed in the bore 16. The liner 18 is disposed in the bore 16. For example, the liner 18 may have an interference fit with the bore wall 30 and an O-ring (not shown), e.g., a rubber O-ring, disposed on one of the liner 18 or the bore wall 30. When the liner 18 is assembled to the engine block 12, i.e., disposed in the bore 16, the liner 18 defines a cylinder of the engine block 12. The cylinders house pistons (not shown), which are moved in the cylinders by the internal-combustion process.

The liner 18 includes an inner wall 38 extending annularly about the axis A. Specifically, the inner wall 38 of the liner 18 defines the cylinder. Additionally, the liner 18 includes an outer wall 40 extending circumferentially about the inner wall 38. The outer wall 40 of the liner 18 is adjacent to the bore wall 30 of the bore 16 when the liner 18 is assembled to the engine block 12, i.e., disposed in the bore 16. A diameter of the outer wall 40 may be substantially equal to the diameter of the bore wall 30. For example, the outer wall 40 may abut the bore wall 30. The liner 18 is metal, e.g., cast iron, steel, etc.

With continued reference to FIGS. 2A, 2B and 4, the liner 18 includes a stop 42 disposed between the ledge 34 and the cylinder head 14. The stop 42 is supported by the ledge 34. The stop 42 includes a flange 44 and the fire dam 22 disposed radially inboard of the flange 44. The fire dam 22 extends annularly about the axis A. Specifically, the fire dam 22 extends from the flange 44 to the inner wall 38 of the liner 18. Additionally, the fire dam 22 extends along the axis A from the flange 44 towards the cylinder head 14, i.e., upwardly. The fire dam 22 is disposed between the flange 44 and the cylinder head 14.

With continued reference to FIGS. 2A, 2B and 4, the flange 44 extends annularly about the axis A. Specifically, the flange 44 extends circumferentially about, and is endless around, the fire dam 22. The flange 44 includes an outer surface 46 extending circumferentially about the axis A. The outer surface 46 is adjacent to the step wall 36 when the liner 18 is assembled to the engine block 12, i.e., disposed in the bore 16. A diameter of at least a portion of the outer surface 46 is substantially equal to the diameter of the step wall 36. For example, the portion of the outer surface 46 may abut the step wall 36.

With continued reference to FIGS. 2A, 2B and 4, the flange 44 includes the seal surface 20 and a bottom surface 48 spaced from each other along the axis A. The outer surface 46 extends along the axis A from the seal surface 20 to the bottom surface 48. The bottom surface 48 extends radially outward from the outer wall 40 of the liner 18 to the outer surface 46. The bottom surface 48 is seated on the ledge 34 when the liner 18 is assembled to the engine block 12, i.e., disposed in the bore 16. That is, the bottom surface 48 abuts the ledge 34. Said differently, the stop 42 may extend a corresponding amount along the axis A as the step wall 36. For example, the bottom surface 48 may be disposed closer to a top of the liner 18 than a midline (i.e., a halfway point between the top and a bottom of the liner 18) of the liner 18, as shown in the Figures. In such an example, the liner 18 may be referred to as a "top stop liner." As another example, the bottom surface 48 may be disposed approximately on the midline the liner 18. That is, the stop 42 may extend approximately halfway along a length of the liner 18. In such an example, the liner 18 may be referred to as a "mid stop liner."

With continued reference to FIGS. 2A, 2B and 4, the seal surface 20 extends radially outward from the fire dam 22 to the outer surface 46. The seal surface 20 is disposed between the deck surface 28 and the cylinder head 14 when the liner 18 is assembled to the engine block 12, i.e., disposed in the bore 16. That is, the outer surface 46 extends along the axis A farther than the step wall 36. The seal surface 20 supports the head gasket 24 when the head gasket 24 is assembled to the engine block 12.

With reference to FIG. 2A, the head gasket 24 extends endlessly around the liner 18. That is, the head gasket 24 creates a circumferentially continuous combustion seal 32 around the liner 18. Specifically, the head gasket 24 is compressed between the seal surface 20 of the liner 18 and the cylinder head 14 to seal around the fire dam 22. The head gasket 24 includes a body (not numbered) that is any suitable compressible material. As examples, the body may be compressible graphite, composite paper, etc.

With reference to FIGS. 2A, 2B, and 4, the head gasket 24 includes a wall 50 extending annularly about the axis A, i.e., the body of the head gasket 24 defines the wall 50. When assembled to the engine 10, the wall 50 extends circumferentially about fire dam 22. That is, the wall 50 is disposed radially outboard of the fire dam 22. Said differently, the wall 50 creates the circumferentially continuous combustion seal 32 around the liner 18. The wall 50 is metal. As examples, the wall 50 may be steel, steel alloy, etc.

The wall 50 defines an opening 52 extending through the head gasket 24 along the axis A. When assembled to the engine 10, the opening 52 is axially aligned with the liner 18, and the fire dam 22 is disposed in the opening 52. The opening 52 may be cylindrical or may be any other suitable shape.

As discussed above, the seal surface 20 of the liner 18 may be misaligned relative to the deck surface 28 (see FIG. 2B), e.g., due to wear, manufacturing tolerances, etc., which may affect the circumferentially continuous combustion seal 32 because an insufficient compressive load may be distributed to the misaligned liner 18. In such an example, a height along the axis A from the deck surface 28 to the seal surface 20 may below a specified height. The specified height may be specified by a manufacturer or designer of the engine 10. The specified height is a minimum height along the axis A from the deck surface 28 to the seal surface 20 below which the head gasket 24 cannot create the circumferentially continuous combustion seal 32 around the liner 18, e.g., due to the compressive load being distributed to the liner 18 being insufficient to create the circumferentially continuous combustion seal 32. The specified height may be determined based on, e.g., empirical testing to determine the minimum height at which the head gasket 24 creates the circumferentially continuous combustion seal 32 about the liner 18.

During maintenance of the engine 10, a shim 26 is assembled to the liner 18, e.g., by a technician, to perfect the circumferentially continuous combustion seal 32. For example, the shim 26 may be selected from a shim kit (not numbered) that includes a plurality of shims 26, as shown in FIG. 3B. Each of the shims 26 in the shim kit may have a different thickness, as discussed further below. For example, the shim kit may include three shims 26 and the thickness of the shims 26 may be 0.002 inches, 0.004 inches, and 0.006 inches, respectively. The shim 26 is selected, e.g., from the shim kit, based on a difference between the height and the specified height. In other words, the shim 26 is selected to correct axial misalignment of the liner 18 relative to the engine block 12, e.g., the deck surface 28. By correcting the axial misalignment of the liner 18 relative to the engine block 12, the shim 26 is compressed by the head gasket 24 around the liner 18, which perfects the circumferentially continuous combustion seal 32.

With reference to FIG. 4A, the shim 26 is supported by the liner 18. For example, the shim 26 may be disposed on the seal surface 20 of the liner 18, i.e., between the fire dam 22 and the outer surface 46 of the flange 44. The shim 26 may extend annularly about the axis A. That is, the shim 26 may be endless around the fire dam 22. The shim 26 may have any suitable shape in cross-section along the axis A. For example, the shim 26 may be rectangular in cross-section along the axis A. The shim 26 may be any suitable type of high strength metal, e.g., stainless steel, etc.

With continued reference to FIG. 4A, the shim 26 abuts the seal surface 20 and the head gasket 24. That is, the shim 26 extends along the axis A from the seal surface 20 to the head gasket 24. The shim 26 is separate and distinct from the head gasket 24 and the seal surface 20. That is, the shim 26 is formed and subsequently positioned on the seal surface 20 of the liner 18, and the head gasket 24 is subsequently positioned on the shim 26. The shim 26 can be positioned on the liner 18 without removing the liner 18 from the bore 16. The shim 26 is then compressed by the head gasket 24 when the head gasket 24 is assembled to the engine block 12.

Figure 3A:
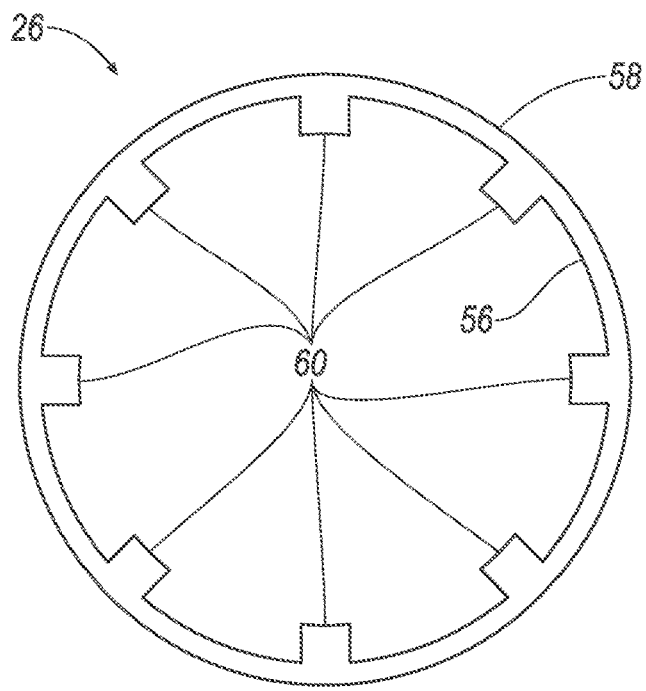
FIG. 3A is a top view of a shim.
Figure 3B:
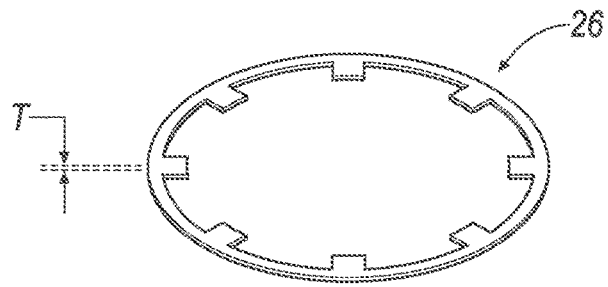
FIG. 3B is a perspective view of a plurality of shims stacked on each other.
Figure 3B:
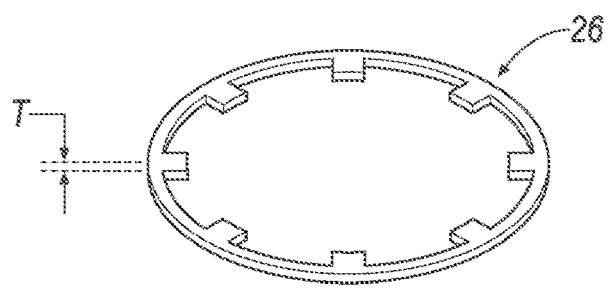
Figure 3B:
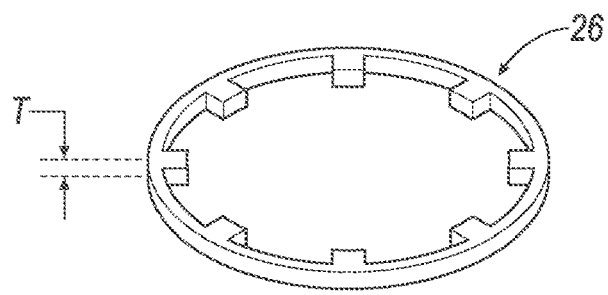
Figure 5:
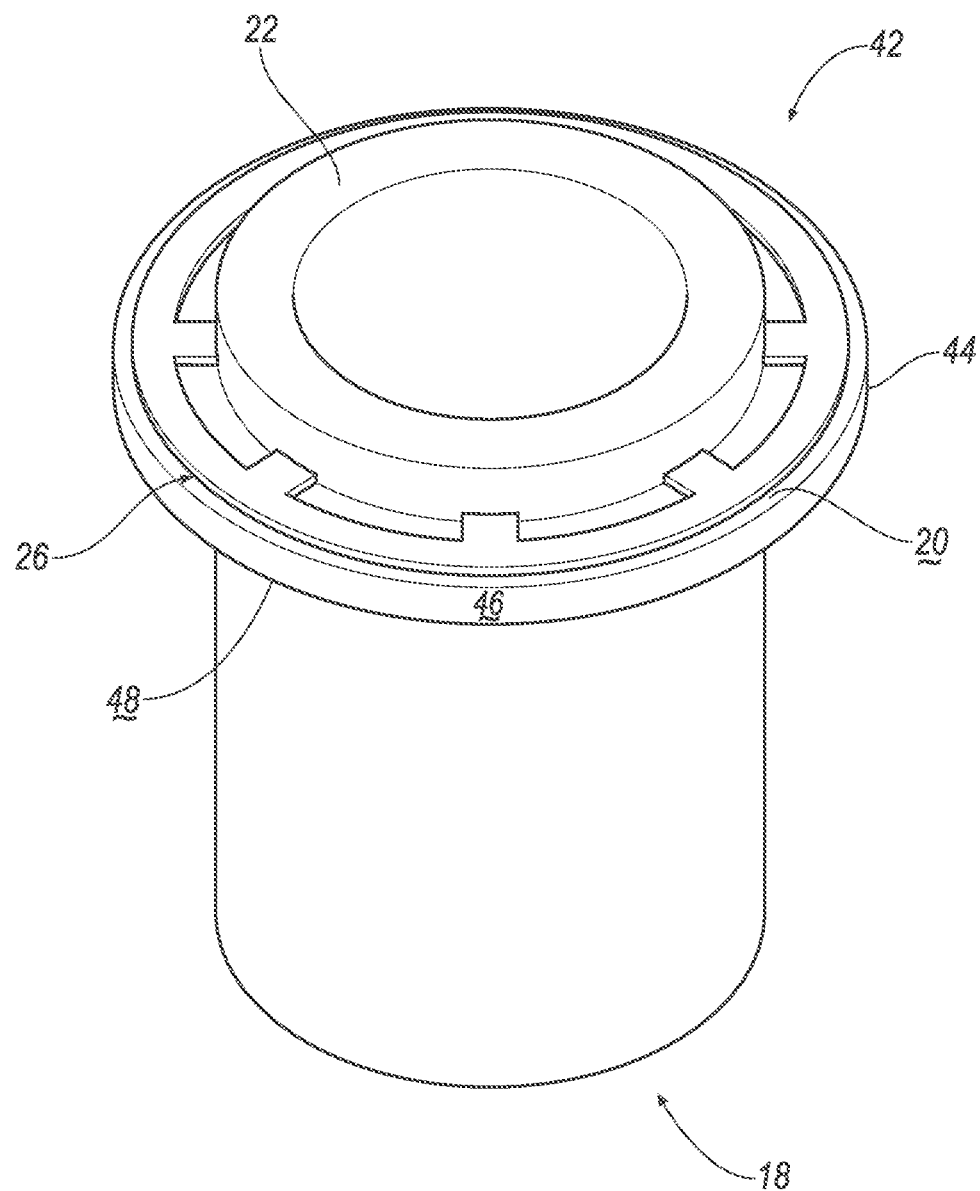
FIG. 5 is a perspective view of the shim disposed on a seal surface of one liner.

The shim 26 includes an inner diameter 56 and an outer diameter 58, as shown in FIG. 3A. The inner diameter 56 extends circumferentially around the fire dam 22. The outer diameter 58 is equal to or less than the diameter of the outer surface 46. That is, the shim 26 is disposed entirely on the seal surface 20, as shown in FIG. 5. The inner diameter 56 of the shim 26 is outside the opening 52 of the head gasket 24, as shown in FIGS. 4A-4B. That is, a diameter of the opening 52 of the head gasket 24 is less than or equal to the inner diameter 56 of the shim 26. For example, the shim 26 may be disposed radially outboard of the wall 50 of the head gasket 24.

The inner diameter 56 may include a plurality of tabs 60 extending radially inward from the inner diameter 56, as shown in FIG. 3A. The tabs 60 are circumferentially spaced from each other. The tabs 60 extend towards the fire dam 22. For example, the tabs 60 may extend to the fire dam 22, as shown in FIGS. 4A-5. The tabs 60 may limit or prevent lateral movement of the shim 26 relative to the fire dam 22. Additionally, the tabs 60 may locate the shim 26 relative to the fire dam 22.

The shim 26 includes a thickness T extending along the axis A. The thickness T is between 0.001-0.009 inches. The shim 26 is selected by a technician based on the height from the seal surface 20 to the deck surface 28. That is, the thickness T of the selected shim 26 is equal to or greater than a difference between the height and the specified height. Said differently, when the shim 26 is seated on the seal surface 20, a height from the seal surface 20 to the deck surface 28 is equal to or greater than the specified height.

The engine 10 may include any suitable number of shims 26. For example, the engine 10 may include one shim 26 supported by one liner 18, as shown in FIG. 4A. As another example, the engine 10 may include a plurality of liners 18 each supporting one respective shim 26. As yet another example, the engine 10 may include any suitable number of liners 18 supporting any suitable number of shims 26. For example, the shim 26 may be further defined as a plurality of shims 26 stacked along the axis A. That is, the plurality of shims 26 may be stacked on each other from the seal surface 20 of the liner 18 to the head gasket 24, as shown in FIG. 4B. In such an example, the shims 26 may have a same or different thickness T. In other words, each shim 26 may have the same thickness T, or at least one shim 26 may have a different thickness T than at least one other shim 26 (see FIG. 3B).

In typical operation, the seal surface 20 of the liner 18 abuts the head gasket 24 such that the head gasket 24 creates a circumferentially continuous combustion seal 32 around the liner 18 when assembled to the engine 10, as shown in FIG. 2A. Typically, the seal surface 20 of the liner 18 is disposed axially above the deck surface 28 of the engine block 12 by at least the specified height. In some instances, the seal surface 20 may be disposed below the specified height, e.g., due to manufacturing tolerances, wear, etc. In such an example, the head gasket 24 may distribute a compressive load to the seal surface 20 that is insufficient to produce the circumferentially continuous combustion seal 32.

To perfect the circumferentially continuous combustion seal 32, a technician removes the cylinder head 14 and the head gasket 24 from the engine block 12 and measures the height from the seal surface 20 of the liner 18 to the deck surface 28. Upon determining the height is below the specified height, the technician then selects a shim 26 based on a difference between the height and the specified height. The technician then assembles the shim 26 to the engine 10, i.e., positions the shim 26 on the seal surface 20 of the liner 18. The technician completes this process for each bore 16 to perfect the circumferentially continuous combustion seal 32 around each liner 18.

Figure 6:
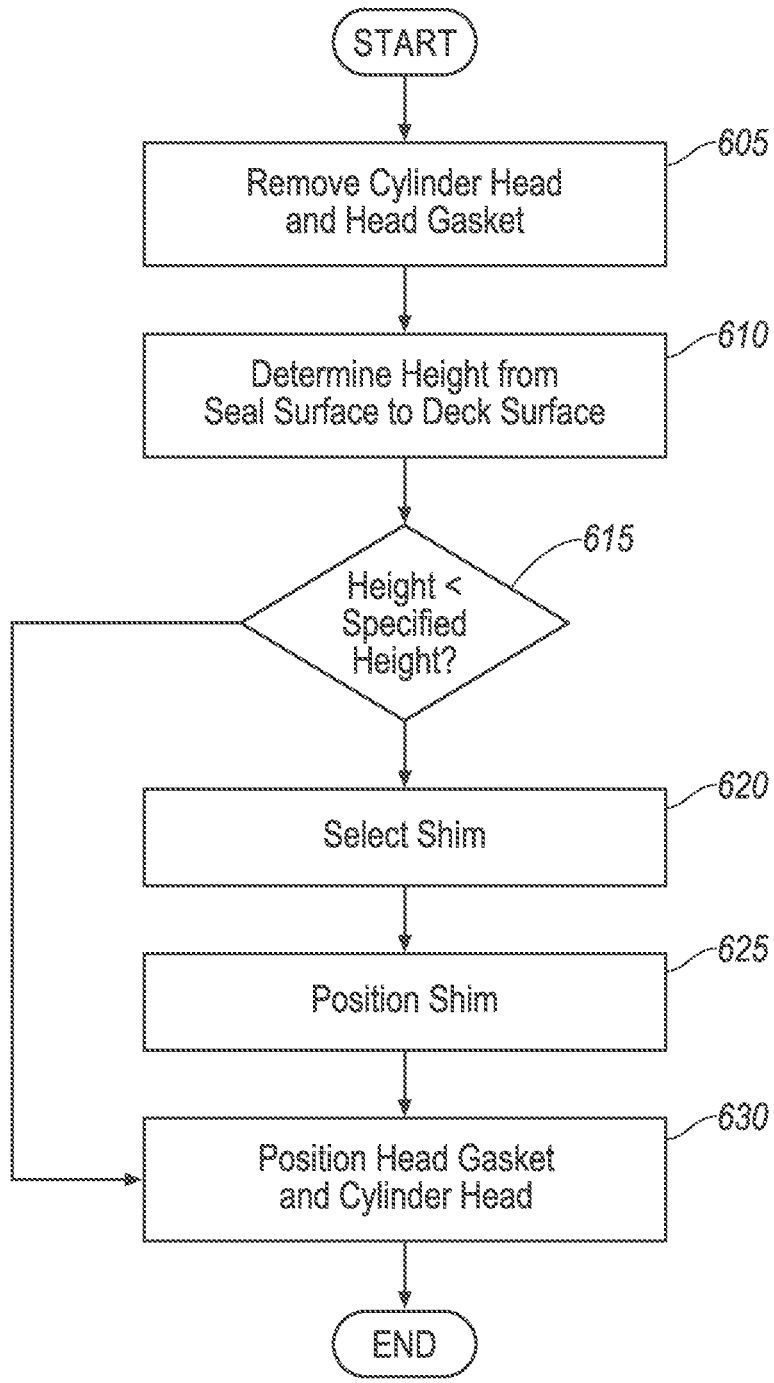
FIG. 6 is an exemplary process flow for placing the shim to perfect the circumferentially continuous seal.

A process 600, as shown in FIG. 6, for modifying the combustion seal 32 is described below. The process 600 beings in a block 605.

In the block 605, the cylinder head 14 and the head gasket 24 are removed from the engine block 12. That is, the seal surface 20 of the liner 18 is exposed. For example, the fasteners that mount the cylinder head 14 to the engine block 12 are removed by a technician, and the cylinder head 14 is lifted off of the engine block 12 by the technician. Additionally, the head gasket 24 is lifted off of the engine block 12 by the technician. The process 600 continues in a block 610.

In the block 610, a height along the axis A from the seal surface 20 of each liner 18 to the deck surface 28 is determined by the technician. For example, the height can be measured by the technician using, e.g., a vertical gauge, calipers, etc. The process 600 continues in a block 615.

In the block 615, the height from each seal surface 20 to the deck surface 28 is compared to a specified height by the technician. As discussed above, the specified height specifies a minimum height between the seal surface 20 and the deck surface 28 below which the combustion seal 32 is inadequate. If the height from one seal surface 20 to the deck surface 28 is less than the specified height, then the process 600 continues in a block 600. Otherwise the process 600 continues in a block 630.

In the block 620, a shim 26 is selected by the technician based on the height. For example, a difference between the specified height and the height is determined by the technician. Upon determining the difference, the shim 26 is selected according to a thickness T of the shim 26. For example, a shim 26 having a thickness T equal to or greater than the difference can be selected by the technician. Specifically, the technician chooses the shim 26 having a thickness T that positions a top surface of the shim 26 (i.e., the surface that abuts the gasket 24) at the specified height of the seal surface 20 within specified tolerances (e.g., a specified height within tolerances provided by the engine manufacturer). As another example, a plurality of shims 26 can be selected and stacked along the axis A by the technician. In such an example, the shims 26 are selected by the technician such that the combined thickness T of the shims 26 along the axis A is equal to or greater than the difference between the specified height and the height. Specifically, the technician chooses the combination of shims 26 having a combined thickness T that positions the top surface of the top shim 26 at the specified height of the seal surface 20 within specified tolerances (e.g., a specified height within tolerances provided by the engine manufacturer). The process 600 continues in a block 625.

In the block 625, the shim 26 is positioned on the liner 18 by the technician. Specifically, the shim 26 is positioned on the seal surface 20. That is, the shim 26 is positioned around the fire dam 22 of the liner 18. For example, the plurality of tabs 60 may locate to the fire dam 22, i.e., abut the fire dam 22 about the axis A. The process 600 continues in the block 630.

In the block 630, the head gasket 24 and the cylinder head 14 are assembled to the engine block 12 by the technician. That is, the head gasket 24 is positioned on the liners 18 and the cylinder head 14 is mounted to the engine block 12 with fasteners to compress the head gasket 24 against the liners 18. For example, following the block 625, the head gasket 24 is positioned on the shim 26 such that the head gasket 24 abuts the shim 26. In such an example, the head gasket 24 is compressed against the shim(s) 26 to perfect the circumferentially continuous combustion seal 32. The process 600 ends following the block 630.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. An engine comprising:
    an engine block and a cylinder head mounted to the engine block;
    the engine block including a bore elongated along an axis and a liner disposed in the bore and extending annularly about the axis;
    the liner includes a seal surface, a bottom surface, and a fire dam disposed radially inward from the seal surface, the bottom surface extending radially outward from the axis and abutting the engine block, the fire dam extending along the axis from the seal surface towards the cylinder head;
    a single-piece head gasket disposed between the engine block and the cylinder head, the head gasket extending endlessly around the fire dam; and
    a shim seated between the seal surface and the single-piece head gasket and abutting the seal surface and the single-piece head gasket, the shim disposed radially outward from the fire dam and extending annularly about the axis.

2. The engine of claim 1, wherein the shim is endless around the fire dam.

3. The engine of claim 1, wherein the engine block includes a deck surface, the seal surface is disposed between the deck surface and the cylinder head.

4. The engine of claim 1, wherein the shim includes an inner diameter and a plurality of tabs extending radially inward from the inner diameter toward the fire dam, the plurality of tabs being circumferentially spaced from each other.

5. The engine of claim 1, wherein the shim includes an inner diameter and the head gasket includes a wall extending circumferentially about the fire dam, the wall defines an opening having a diameter equal to or less than the inner diameter.

6. The engine of claim 5, wherein the shim includes a plurality of tabs extending radially inward from the inner diameter toward the fire dam, the plurality of tabs being circumferentially spaced from each other.

7. The engine of claim 1, wherein the shim has a thickness along the axis, the thickness is between 0.001-0.009 inches.

8. The engine of claim 1, wherein the shim is further defined as a plurality of shims stacked along the axis.

9. The engine of claim 8, wherein at least one of the plurality of shims has a different thickness along the axis than the other of the plurality of shims.

10. The engine of claim 1, wherein the shim has a rectangular cross-section along the axis.

11. The engine of claim 1, wherein the engine block includes a deck surface, a ledge spaced from the deck surface along the axis and a step wall extending from the deck surface to the ledge, and wherein the bottom surface abuts the ledge.

12. A method comprising:
    removing a cylinder head and a single-piece head gasket to expose a seal surface of a liner disposed in a bore of an engine block;
    measuring a height from the seal surface to a deck surface of the engine block with a vertical gauge or calipers;
    selecting a shim based on determining a difference between the height and a specified height;
    positioning the shim on the seal surface; and
    positioning the single-piece head gasket on the shim with the shim between the head gasket and the seal surface.

13. The method of claim 12, further comprising forming the liner with a fire dam disposed radially inward from the seal surface and extending upwardly from the seal surface.

14. The method of claim 13, further comprising forming the shim with an inner diameter and a plurality of tabs extending toward the fire dam and locating the shim relative to the fire dam.

15. The method of claim 13, further comprising forming the shim with an inner diameter and forming the head gasket with a wall defining an opening having a diameter equal to or less than the inner diameter.

16. The method of claim 15, further comprising forming the shim with a plurality of tabs extending from the inner diameter toward the fire dam and locating the shim relative to the fire dam.

17. The method of claim 12, wherein the shim is further defined as a plurality of shims stacked along an axis, at least one of the plurality of shims has a different thickness along the axis than the other of the plurality of shims.

18. The method of claim 12, further comprising forming the shim with a rectangular cross-section along an axis.

19. The method of claim 12, further comprising forming the shim of metal.

20. A method comprising:
    assembling a liner into a bore of an engine block such that a bottom surface of the liner abuts a ledge of the engine block, the bore elongated along an axis and the ledge spaced from a deck surface of the engine block along the axis, the engine block including a step wall extending from the deck surface to the ledge;
    measuring a height from a seal surface of the liner to the deck surface of the engine block;
    selecting a shim based on determining a difference between the height and a specified height;
    positioning the shim on the seal surface; and
    positioning a single-piece head gasket on the shim with the shim between the head gasket and the seal surface.

* * * * *